United States Patent
Shiohara et al.

(10) Patent No.: US 6,772,869 B2
(45) Date of Patent: Aug. 10, 2004

(54) FLUID PRESSURE CONTROL VALVE APPARATUS FOR CLUTCH OR BRAKE

(75) Inventors: Masaki Shiohara, Komatsu (JP); Takuma Nishimura, Komatsu (JP); Yoshiharu Sato, Komatsu (JP)

(73) Assignee: Komatsu Ltd. (JP)

( * ) Notice: Subject to any disclaimer, the term of this patent is extended or adjusted under 35 U.S.C. 154(b) by 0 days.

(21) Appl. No.: 10/235,677

(22) Filed: Sep. 6, 2002

(65) Prior Publication Data

US 2003/0047412 A1 Mar. 13, 2003

(30) Foreign Application Priority Data

Sep. 10, 2001 (JP) ......................................... 2001-274307

(51) Int. Cl.[7] .......................... F16H 61/06; F16D 42/02
(52) U.S. Cl. ................................. 192/109 F; 192/3.58
(58) Field of Search .............................. 192/3.58, 85 R, 192/109 F, 30 W, 87.1, 87.11; 137/486, 625.65; 91/433, 459; 477/131

(56) References Cited

U.S. PATENT DOCUMENTS

| | | | | |
|---|---|---|---|---|
| 3,566,716 A | * | 3/1971 | Chatterjea ................ | 192/109 F |
| 3,618,424 A | * | 11/1971 | Golan et al. ................ | 475/129 |
| 3,722,646 A | * | 3/1973 | Oguma ..................... | 192/109 F |
| 3,809,201 A | * | 5/1974 | Miyanishi et al. ........ | 192/109 F |
| 3,874,255 A | * | 4/1975 | Minami ...................... | 477/131 |
| 3,991,865 A | * | 11/1976 | Komatsu ................ | 192/109 F |
| 4,000,795 A | * | 1/1977 | Patton ..................... | 192/109 F |
| 4,086,994 A | * | 5/1978 | Hirosawa et al. ........ | 192/109 F |
| 4,465,168 A | * | 8/1984 | Sato .......................... | 192/3.57 |
| 4,531,433 A | * | 7/1985 | Suga .......................... | 477/138 |
| 5,035,312 A | * | 7/1991 | Asayama et al. ......... | 192/85 R |
| 5,168,973 A | * | 12/1992 | Asayama et al. ......... | 192/85 R |
| 6,499,577 B2 | | 12/2002 | Kitamoto et al. ............. | 192/85 |

FOREIGN PATENT DOCUMENTS

JP          63-235732          9/1988

* cited by examiner

Primary Examiner—Saúl Rodriguez
(74) Attorney, Agent, or Firm—Rader, Fishman & Grauer PLLC

(57) ABSTRACT

A fluid pressure control valve apparatus for a clutch or a brake which is small in size and capable of reducing occurrence of malfunction of a pressure control valve caused by dust caught therein is provided. For this purpose, a fluid pressure control valve apparatus (2) for controlling a pressure of a fluid and feeding it to a clutch or a brake includes a pressure control valve (30) for controlling fluid pressure, an electromagnetic proportional pilot operated valve (50) for issuing an operation command for the pressure control valve with pilot pressure according to a command current to a proportional solenoid (40), and a flow detecting valve (10) for detecting a flow of the fluid to be fed to the clutch or the brake from the pressure control valve to detect completion of filling in the clutch or the brake.

3 Claims, 12 Drawing Sheets

FIG. 5a PROPORTIONAL SOLENOID COMMAND CURRENT
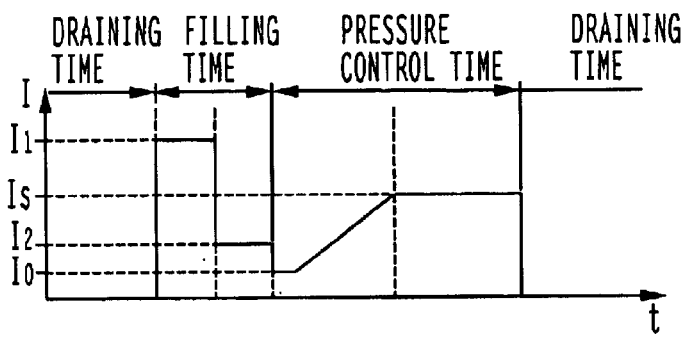
FIG. 5b PILOT PRESSURE
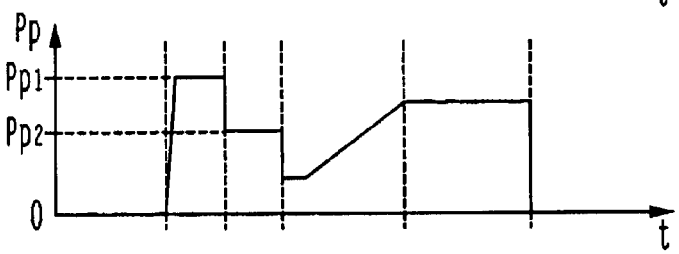
FIG. 5c VALVE CHAMBER PRESSURE
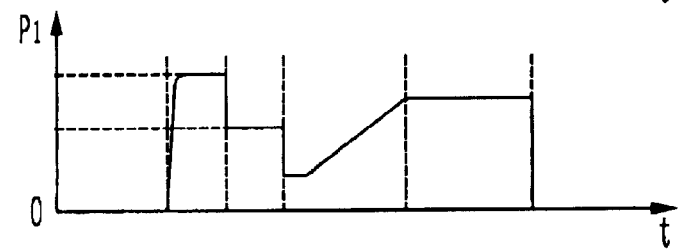
FIG. 5d CLUTCH PRESSURE
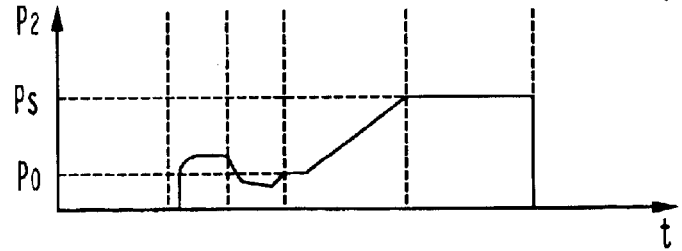
FIG. 5e SENSOR DETECTION SIGNAL
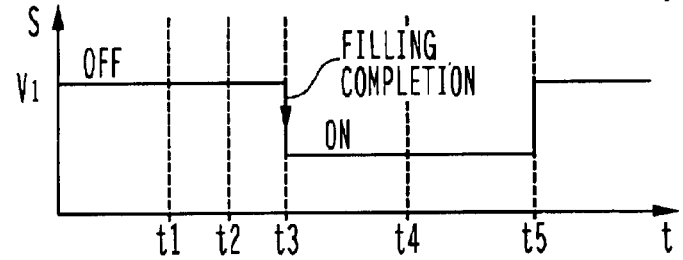

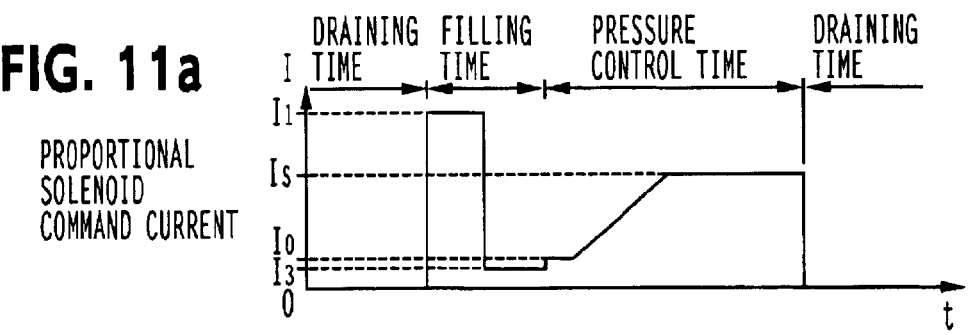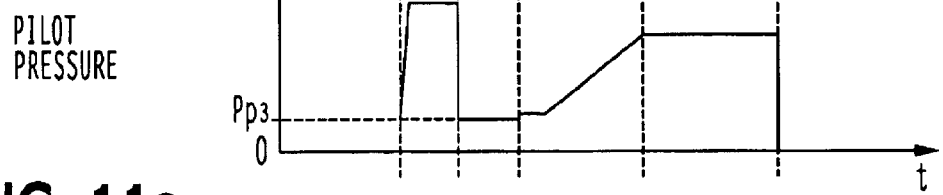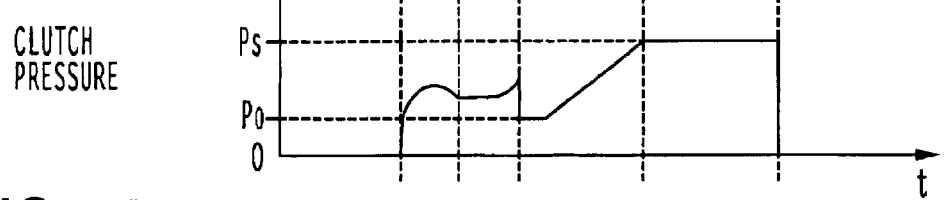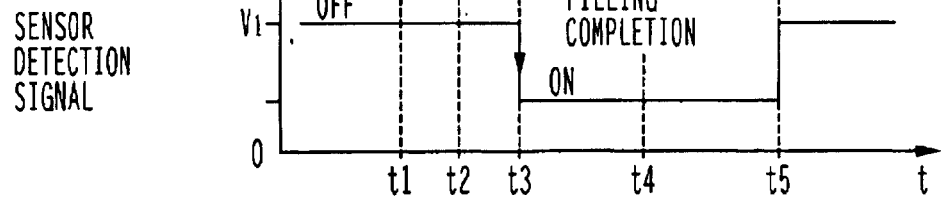

US 6,772,869 B2

FLUID PRESSURE CONTROL VALVE APPARATUS FOR CLUTCH OR BRAKE

TECHNICAL FIELD

The present invention relates to a fluid pressure control valve apparatus for a clutch or a brake.

BACKGROUND ART

As a conventional clutch hydraulic control apparatus, for example, the one disclosed in Japanese Patent Laid-open No. 63-235732 is known. FIG. 12 and FIG. 13 are a hydraulic circuit diagram of a clutch oil pressure control apparatus and a sectional view showing a constitution of an oil pressure control valve in the control apparatus, which are disclosed in Japanese Patent Laid-open No. 63-235732.

In FIG. 12 and FIG. 13, a control valve 2 for controlling a clutch cylinder 1 has a pressure control valve 80 for controlling a clutch pressure, a flow detecting valve 70 for detecting a flow inside the clutch cylinder 1, and a sensor section 3 for detecting a filling in the clutch cylinder 1 and a clutch pressure. The pressure control valve 80, the flow detecting valve 70 and the sensor section 3 are housed in an integral housing 78. The control apparatus has a controller 90, the pressure control valve 80 is controlled by the controller 90, and a detection signal S of the sensor section 3 is inputted into the controller 90. The clutch cylinder 1 is connected to a clutch not shown.

The pressure control valve 80 has a spool 81 directly operated by a plunger 83 of a proportional solenoid 82 driven with a thrust force corresponding to a magnitude of a command current I from the controller 90 to control an opened amount thereof, and controls the clutch pressure. The flow detecting valve 70 feeds oil to the clutch cylinder 1 via an orifice 75 provided at the spool 71, and when a fluid is filled in the clutch cylinder 1, then the fluid flow is stopped and pressure is built up, the flow detecting valve 70 is moved by a difference in pressure receiving areas on both sides of the orifice 75 and comes in contact with the sensor section 3, whereby a filling completion signal is outputted to the controller 90.

However, the clutch hydraulic control apparatus disclosed in the above-described Japanese Patent Laid-open No. 63-235732 has the following disadvantage.

Since the spool 81 of the pressure control valve 80 is directly operated by the thrust force of the plunger 83 of the proportional solenoid 82, the magnitude of the thrust force of the proportional solenoid 82 has a large influence on the performance and function of the clutch hydraulic control apparatus. Namely, with use of the small-sized proportional solenoid 82, the thrust force thereof is small, thus causing a fear that malfunction of the pressure control valve 80 easily occurs when dust is caught therein. On the other hand, use of a large-sized proportional solenoid 82 to obtain a large thrust force causes an increase in the size of the clutch hydraulic control device and the cost.

SUMMARY OF THE INVENTION

The present invention is made in view of the above-described disadvantage, and its object is to provide a fluid pressure control valve apparatus for a clutch or a brake, which is small in size and capable of reducing occurrence of malfunction of the pressure control valve which is caused by dust caught therein.

In order to attain the above-described object, a fluid pressure control valve apparatus for a clutch or a brake, which controls pressure of a fluid and feeds the fluid to a clutch or a brake, according to the present invention, has a constitution including a pressure control valve for controlling a fluid pressure to the clutch or the brake, an electromagnetic proportional pilot operated valve for issuing an operation command for the pressure control valve with a pilot pressure corresponding to a command current applied to a proportional solenoid, and a flow detecting valve for detecting a flow of the fluid fed to the clutch or the brake from the pressure control valve to detect completion of filling in the clutch or the brake.

According to the above constitution, the spool of the pressure control valve is operated with the pilot pressure, and therefore the spool of the pressure control valve is controlled with a large oil pressure even if the proportional solenoid is small-sized and its thrust force is small, thus making it possible to reduce malfunction of the spool caused by dust caught therein. In addition, the proportional solenoid can be made small in size, and thereby the small-sized fluid pressure control valve apparatus at low cost can be constructed. Further, the flow of the fluid to the clutch or the brake is detected with the flow detecting valve, and the completion of filling is detected according to this flow, thus making it possible to detect the completion of filling accurately without having an influence of the variation of the fed pressure of the pressure control valve caused by the line resistance and the like up to the clutch or the brake. Consequently, reliability of the fluid pressure control valve apparatus can be improved.

The fluid pressure control valve apparatus for the clutch or the brake may have the constitution in which the pressure control valve has a feedback chamber at one end side of a spool, and a pilot chamber for receiving the pilot pressure at the other end side, introduces the fluid, which is to be fed to the clutch or the brake, into the feedback chamber, balances the pressure of the fluid, which is introduced into the feedback chamber, with a magnitude of the pilot pressure generated in the pilot chamber to increase pressure of the fed fluid, and controls the pressure in a cylinder of the clutch or the brake; and the electromagnetic proportional pilot operated valve has a valve element which moves between a fully opened state and a shutoff state of a drain outlet path of a pilot fluid introduced into the pilot chamber to control a drain outlet flow of the pilot fluid, and controls the pilot pressure by moving the valve element from the shutoff position to the fully opened position with a thrust force of a plunger of the proportional solenoid.

According to the above constitution, the electromagnetic proportional pilot operated valve for directly controlling the pilot pressure in contact with the pilot pressure receiving chamber, which is provided at the other end side of the pressure control valve, is provided, thereby making it possible to obtain the fluid pressure control valve apparatus for the clutch or the brake with a simple structure at low cost.

Further, the fluid pressure control valve apparatus for the clutch or the brake may have the constitution in which the fluid pressure control valve apparatus further includes a housing in which a first pump oil passage that communicates with a fluid pressure source, a second pump oil passage and a cylinder chamber inlet passage which communicate with a cylinder of the clutch or the brake, and a cylinder chamber fluid drain passage for draining the fluid inside the cylinder are formed, the pressure control valve
- i) is movably housed in the housing, and biased by a spring to a position to shut off the communication between the first pump oil passage and the second pump oil passage and communicate the second pump oil passage and the cylinder chamber fluid drain passage, and
- ii) moves between a position to shut off the second pump oil passage and the cylinder chamber fluid drain passage from each other and communicate the first pump oil passage and the second pump oil passage, and a position to shut off the first pump oil passage and the second pump oil passage from each other and communicate the second pump oil passage and the cylinder chamber fluid drain passage, by a pressure of a clutch pressure feedback chamber that is formed at one end side to communicate with the second pump oil passage, and a pressure of a pilot pressure receiving chamber formed at the other end side, the flow detecting valve is placed in the housing, allows a flow of the fluid, which is from the second pump oil passage to the cylinder chamber inlet passage, to flow therein via a throttle passage, and when the flow of the fluid flow via the throttle passage is stopped as a result of the fluid being filled, in the cylinder chamber inlet passage, moves by a pressure difference before and after the throttle passage to be in contact with a sensor section, and detects the filling of the fluid in the cylinder, and the fluid pressure control valve apparatus further includes a pilot fluid inlet path which is formed inside the housing extends from the first pump oil passage via the throttle flow passage to be branched, and allows the pilot fluid to flow into the pilot pressure receiving chamber, a pilot fluid outlet path which is formed inside the housing and drains the pilot fluid from the pilot pressure receiving chamber, and a valve element which is placed inside the housing, and moves between a shutoff communication position, a throttled communication position by an optional amount, and a fully opened communication position, so as to connect the pilot fluid inlet path and the pilot fluid outlet path to be controllable, the electromagnetic proportional pilot operated valve is placed at an outer wall of the housing, and the proportional solenoid controls a pressure level of the pilot fluid in the pilot pressure receiving chamber by controlling a moving position of the valve element in order to control a moving position of the pressure control valve so that a pressure inside the clutch pressure feedback chamber and a pressure inside the pilot pressure receiving chamber balance with each other.

According to the above constitution, the inlet path for the pilot fluid, which allows the pilot fluid to flow into the pilot pressure receiving chamber of the pressure control valve via the throttle, is provided in the first pump oil passage, and therefore the first pump oil passage always has a constant flow kept by the throttle and the flow of the pump fluid which is allowed to flow into the second pump oil passage via the pressure control valve can be kept constant. Further, since the pressure control valve provides opening to communicate the first pump oil passage and the second pump oil passage in the state in which the pressure control is performed by an operation control of the electromagnetic proportional pilot operated valve, the flow of the fluid inside the first pump oil passage is kept, without a change in the inflow flow to the pilot fluid inlet path, and thus the operation control of the pressure control valve can be performed with stability.

BRIEF DESCRIPTION OF THE DRAWINGS

FIG. 5a to FIG. 5e are a time charts of the first embodiment,

FIG. 5a shows a command current I of a proportional solenoid,

FIG. 5b shows pilot pressure Pp of a pilot chamber,

FIG. 5c shows pressure P1 of a valve chamber,

FIG. 5d shows clutch pressure P2 of an oil chamber, and

FIG. 5e shows detection output S of a sensor section;

FIG. 11a to FIG. 11e are a time chart of the second embodiment;

FIG. 11a shows a command current I of a proportional solenoid,

FIG. 11b shows pilot pressure Pp of a pilot chamber,

FIG. 11c shows pressure P1 of a valve chamber,

FIG. 11d shows clutch pressure P2 of an oil chamber, and

FIG. 11e shows detection output S of a sensor section;

BEST MODE FOR CARRYING OUT THE INVENTION

Figure 1:
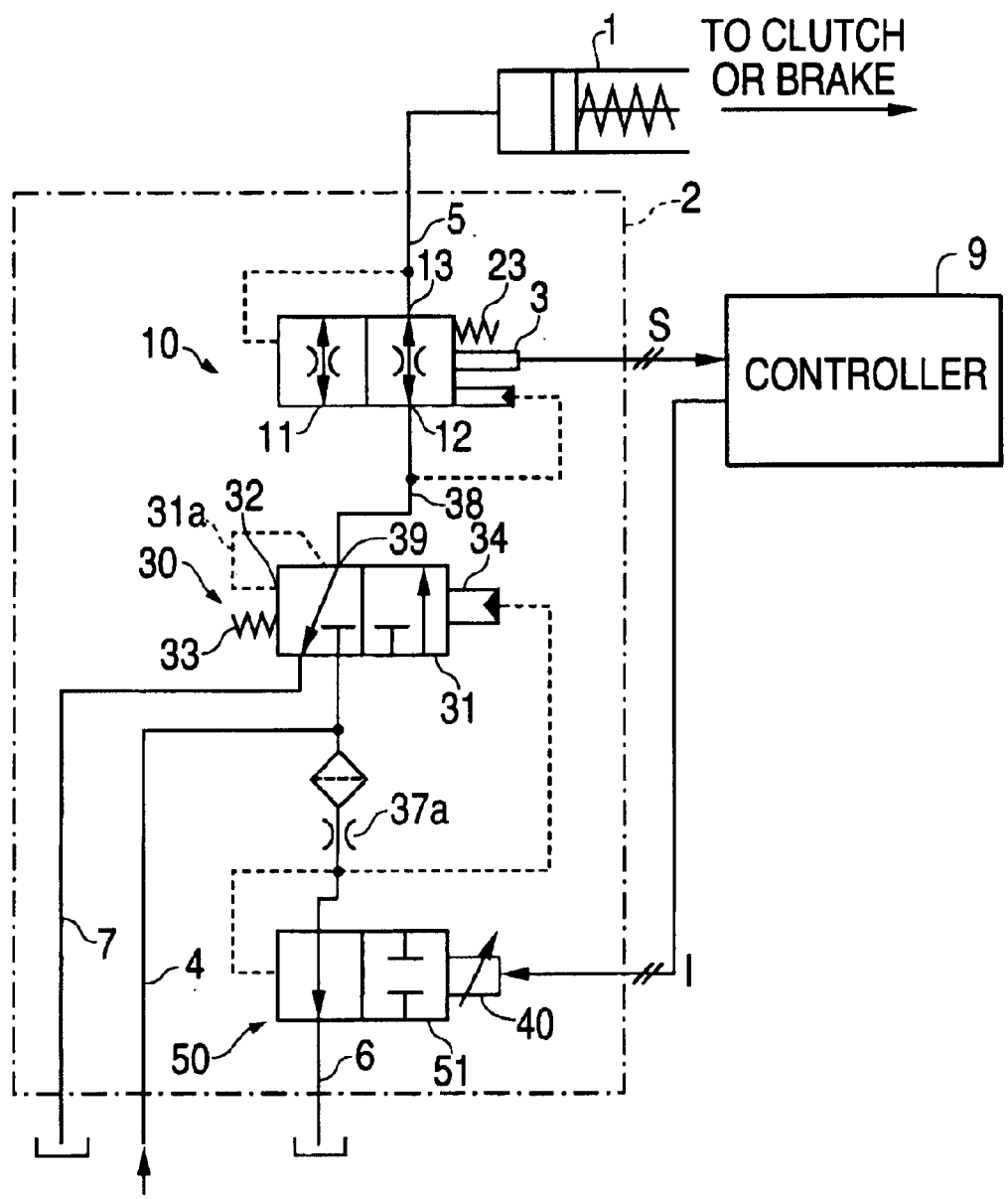
FIG. 1 is a hydraulic circuit diagram of a fluid pressure control valve apparatus of a first embodiment of the present invention.

Preferred embodiments according to the present invention will be explained in detail below with reference to the drawings. The explanation will be made with an example of a clutch cited below. Top, bottom, left and right in the explanation represent the top, bottom, left and right in the drawings.

A first embodiment will be explained based on FIG. 1 to FIG. 4, and FIG. 5a to FIG. 5e.

Figure 2:
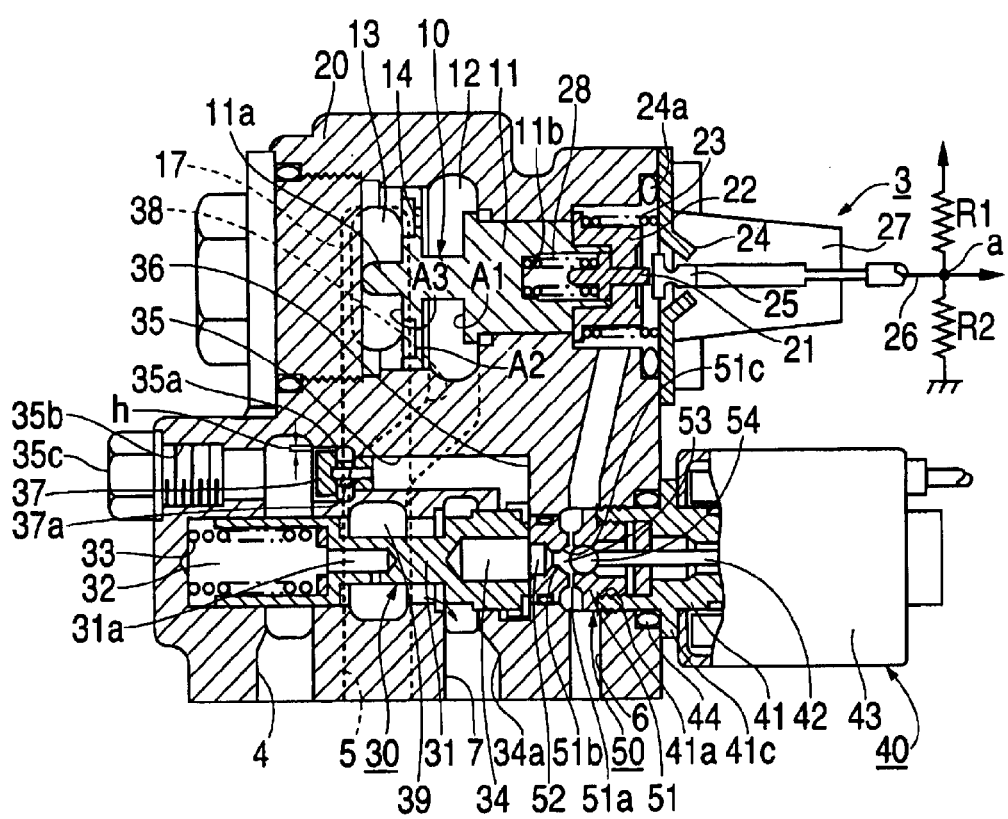
FIG. 2 is a sectional view showing a constitution of a valve of the first embodiment.

FIG. 1 is a hydraulic circuit diagram of a fluid pressure control valve apparatus of the first embodiment, and FIG. 2 is a sectional view showing a constitution of a valve in the same apparatus. In FIG. 1 and FIG. 2, a control valve (fluid pressure control valve apparatus) 2 for controlling oil pressure of a clutch cylinder 1 includes a flow detecting valve 10, a pressure control valve 30, an electromagnetic proportional pilot operated valve 50, a proportional solenoid 40 and a sensor section 3 in an integrated housing 20. An input port (first pump oil passage) 4, an output port (cylinder chamber inlet passage) 5, a drain port (pilot fluid outlet passage) 6, and a drain port (cylinder chamber fluid drain passage) 7 are formed in the housing 20.

A hydraulic pump not shown is connected to the input port 4, the clutch cylinder 1 is connected to the output port 5, and a tank is connected to the drain ports 6 and 7. The clutch cylinder 1 is connected to a clutch not shown. When it is applied to a brake, reference numeral "1" designates a brake cylinder 1, which is connected to a brake not shown. Accordingly, the reference numeral "1" designates the cylinder 1 for a clutch or a brake.

The pressure control valve 30 is provided at a left side of a lower part of the housing 20, and the electromagnetic proportional pilot operated valve 50 is provided at a right side of the pressure control valve 30. The pressure control valve 30 has a spool 31 inserted in the housing 20 to be movable in a lateral direction. A valve chamber 39 is formed around a substantially center part of the spool 31 inside the housing 20. A pressure feed back chamber 32 is formed at a left end portion of the spool 31, and the valve chamber 39 and the pressure feed back chamber 32 communicate with each other via a flow passage 31a formed inside the spool 31. A spring 33 is attached between the pressure feed back chamber 32 and an inner face of the housing 20, and the spool 31 is biased in a rightward direction by the spring 33. A pilot chamber (pilot pressure receiving chamber) 34 is formed at a right end portion of the spool 31, and a pilot pressure receiving face 34a is formed at a right end face of the spool 31.

When the spool 31 is moved to a right end by a biasing force of the spring 33, the spool 31 shuts the input port 4 from the valve chamber 39 and communicates the valve chamber 39 with the drain port 7. The "right end" as described above means a position at which the spool 31 abuts against a valve seat body 51 of the electromagnetic proportional pilot operated valve 50 that will be described later. When the spool 31 is moved in a leftward direction against the biasing force of the spring 33, the spool 31 provides an opening between the input port 4 and the valve chamber 39, and provides blockage between the valve chamber 39 and the drain port 7.

Lateral flow passages 35a and 35 and a vertical flow passage 36 are formed inside the housing 20, and the input port 4 and the pilot pressure receiving face 34a of the spool 31 communicate with each other via the flow passages 35a, 35 and 36. A thread plug 37 is inserted into the flow passage 35a provided between the aforementioned lateral flow passage 35 and the input port 4. A thread portion is formed at a right side of the thread plug 37, the thread portion is screwed in an inner circumferential surface of the flow passage 35, and a ring-shaped clearance h is included between an outer circumferential surface of a left side of the thread plug 37 and the inner circumferential surface of the flow passage 35a. A throttle flow passage 37a which communicates a space portion of the clearance h and the flow passage 35 is formed inside the thread plug 37. The space portion of the clearance h forms a so-called clearance filter, and has a filter function of preventing clogging of the throttle flow passage 37a.

The thread plug 37 can be attached or detached from a thread hole 35b provided on an extension line of the flow passage 35a in the housing 20, and therefore replacement, cleaning and the like of the thread plug 37 at the above-described filter part can be facilitated. A plug 35c closes the screw hole 35b except at the time of maintenance or the like.

The electromagnetic proportional pilot operated valve 50 is inserted in the housing 20 at a right side of the spool 31, and has the valve seat body 51 attached to a connection member 41 of the proportional solenoid 40 with thread engaging, and a valve element 54. A pilot chamber 52 is formed at a left end portion of the valve seat body 51, and a left end face of the valve seat body 51 and the right end face of the spool 31 are free to abut against each other, and the pilot chamber 52 and the pilot chamber 34 of the spool 31 communicate with each other. A valve housing chamber 53 for housing the valve element 54 movably in an axial direction is formed at an axial center of the right end portion of the valve seat body 51.

Inside the valve seat body 51, a drain flow passage 51b in an axial direction, which communicates the pilot chamber 52 and the valve housing chamber 53, and a drain flow passage 51a in a radial direction, which communicates the drain passage 51b and an outer circumferential face of the valve seat body 51, are respectively formed. A valve element seat face 51c is formed in an inner part of the valve housing chamber 53, at a spot where the drain flow passage 51b and the drain flow passage 51a communicate with each other. An outer end portion of the drain flow passage 51a communicates with the drain port 6.

The above-described input port 4, the flow passage 35a, the space portion of the clearance h, the throttle flow passage 37a, the flow passages 35 and 36, the pilot chamber 34, the pilot chamber 52, the drain flow passage 51b, the drain flow passage 51a, the valve element 54, the valve element seat face 51c, the drain port 6 and the like constitute a pilot circuit.

The proportional solenoid 40 is attached to an outer face of the housing 20 at the right side of the electromagnetic proportional pilot operated valve 50. The proportional solenoid 40 has a main body part 43 including a solenoid part which receives a command current from the controller 9, a connecting member 41 provided to protrude leftward from a center portion of the main body part 43, and a plunger 42 provided at an axis portion to freely advance and retreat in an axial direction (lateral direction). A cylindrical connecting part having a flange 41c is formed at a left portion of the connecting member 41, a thread portion is formed at an outer circumferential face of a left end portion of the cylindrical connecting part, and the thread portion is attached to the housing 20 by being screwed into it. A screw portion 41a is provided at an inner circumferential face of the aforementioned cylindrical connecting part and the valve seat body 51 is attached to the thread portion 41a of the inner circumferential face. A lip end portion of the plunger 42 is inserted into the valve housing chamber 53 of the valve seat body 51 to be movable in an axial direction, and it abuts against the valve element 54. A space between the aforementioned outer circumferential face thread portion of the cylindrical connecting part and the flange 41c is sealed with an O-ring 44.

The flow detecting valve 10 is housed in an upper part of the housing 20, and the sensor section 3 is provided at a right side of the flow detecting valve 10. The flow detecting valve 10 has a spool 11, which is inserted in the housing 20 to be movable in a lateral direction. The spool 11 forms an oil chamber (second pump oil passage) 12 and an oil chamber 13 inside the housing 20, and an orifice 14 is formed in the spool 11 between the oil chamber 12 and the oil chamber 13. A projected portion 11a projected inside the oil chamber 13 at a left side is provided at a left end portion of the spool 11. The oil chamber 13 communicates with the output port 5 via a flow passage 17, and the oil chamber 12 is communicate with the valve chamber 39 via a flow passage 38. When pressure receiving areas in the lateral direction of FIG. 2 of the spool 11, which face the oil chambers 12 and 13, are assumed to be A1, A2, and A3 as shown in FIG. 2, relationship of "A1+A3>A2" is established between the rightward pressure receiving areas (A1+A3) and the leftward pressure receiving area A2, and therefore when the oil pressures of the oil chamber 12 and the oil chamber 13 become equal, the spool 11 moves rightward.

A spring chamber 11b in a concave form is formed at an axis portion at a right end of the spool 11, and a spring 28 is inserted in the spring chamber 11b. A cap member 22 is fitted onto an outer circumferential portion of the right end of the spool 11, and a substantially center projected portion of a detection pin 21 of the sensor section 3 is attached to be sandwiched between the cap member 22 and the spring 28, and the detection pin 21 is pressed by the cap member 22 by a biasing force of the spring 28. A tip end portion of a right side of the detection pin 21 penetrates through the cap member 22 to be protruded rightward. Further, a fixing member 24 is attached to the outer face of the housing 20 at a right side from the cap member 22 with a bolt, and a biasing force of a spring 23 inserted between the fixing member 24 and the cap member 22 presses the cap member 22 leftward.

An output pin 25 is attached at a position opposing the detection pin 21 by the fixing member 24, and a scaling member 27 is provided at an outer face of the fixing member 24 to close a clearance from the output pin 25. An intermediate point a of series connection of resistance R1 and resistance R2 is connected to a right portion of the output pin 25 via a lead wire 26, and a DC voltage V (for example, DC24V) of a predetermined voltage is applied to both end portions of the series connection of the resistance R1 and the resistance R2. The housing 20 is earthed. The aforementioned point a is connected to the controller 9. An O-ring 24a is attached between the fixing member 24 and the housing 20.

Figure 3:
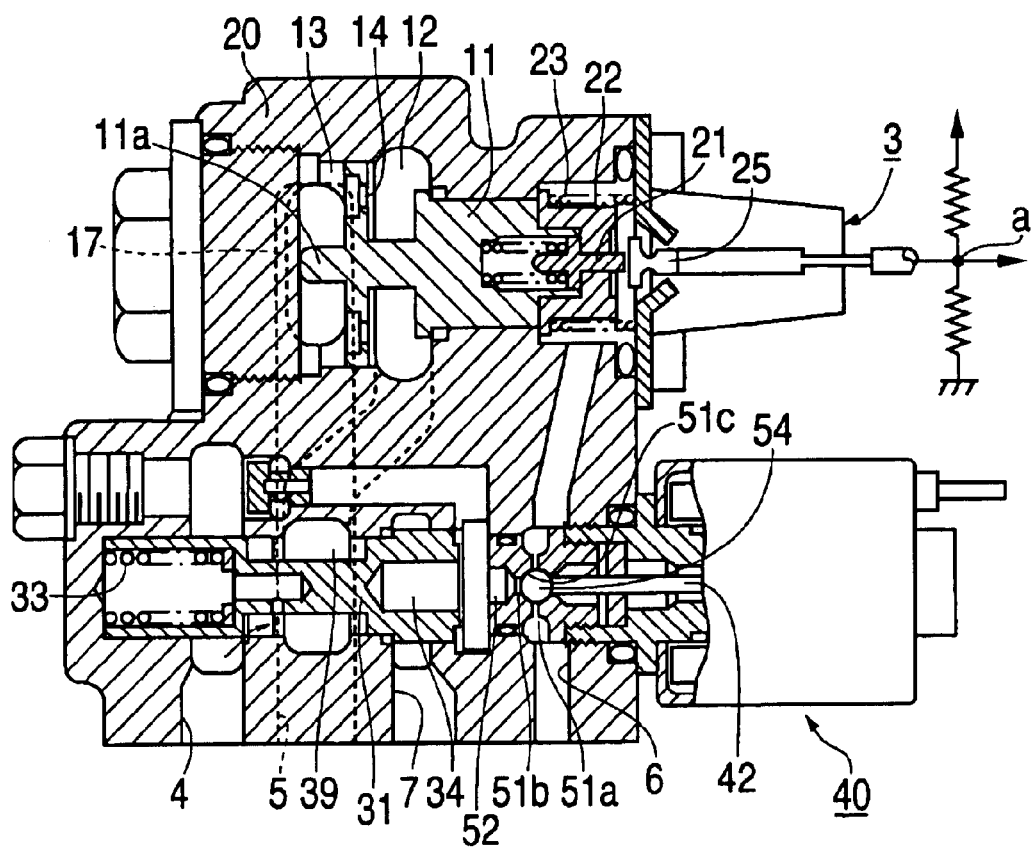
FIG. 3 is an explanatory view of an operation of the first embodiment, which shows an opened state of a pressure control valve.

Next, an operation of the fluid pressure control valve apparatus of the first embodiment will be explained with reference to a time chart shown in FIG. 5a to FIG. 5e based on FIG. 2 to FIG. 4. In FIG. 5a to FIG. 5e, the horizontal axis represents time t, FIG. 5a represents the command current I of the proportional solenoid 40, FIG. 5b represents pilot pressure Pp of the pilot chamber 34, FIG. 5c represents pressure P1 of the oil chamber 12 (valve chamber 39), FIG. 5d represents pressure (clutch pressure) P2 of the oil chamber 13, FIG. 5e represents detection output S of the sensor section 3 (potential at the point a).

(1) At the Time of Clutch Draining

When the command current I applied to the proportional solenoid 40 from the controller 9 is zero, the plunger 42 is in a state in which it is moved rightward and retracted, and therefore the valve element 54 is pressed by the pilot fluid inside the pilot chambers 34 and 52, and moved away from the valve element seat face 51c, whereby the drain flow passage 51b and the drain flow passage 51a communicates with each other. Consequently, the oil from the pump (not shown) successively flows into the input port 4 to the space portion of the clearance h of the flow passage 35a to the throttle flow passage 37a of the thread plug 37 to the flow passages 35 and 36 to the pilot chambers 34 and 52 to the drain flow passage 51b to the drain flow passage 51a to the drain port 6, and drained to the tank. As a result, the pilot pressure Pp inside the pilot chamber 34 is not built up as shown in FIG. 5b, and thus the spool 31 of the pressure control valve 30 is moved rightward by the biasing force of the spring 33 and abuts against the valve seat body 51 of the electromagnetic proportional pilot operated valve 50 to be positioned, as shown in FIG. 2.

Consequently, blockage is provided between the input port 4 and the valve chamber 39, an opening is provided between the valve chamber 39 and the drain port 7, and thus the pressure of the valve chamber 39 is not built up. In this situation, the oil chamber 13 communicating with the clutch cylinder 1 via the flow passage 17 and the output port 5 communicates with the oil chamber 12 and the valve chamber 39 via the orifice 14 of the spool 11, and thus oil pressure inside the clutch cylinder 1 does not occur. The cap member 22 and the detection pin 21 are pressed leftward by the biasing force of the spring 23, the detection pin 21 and the output pin 25 are in a non-contact state, and the potential at the point a becomes a predetermined voltage V1 which is derived by dividing the DC voltage V by the resistances R1 and R2 as shown in FIG. 5c.

(2) At the Time of Clutch Filling

When engaging the clutch, the controller 9 outputs a command current I1 corresponding to a predetermined large flow value to the proportional solenoid 40 at the point of time t1 as shown in FIG. 5a. This command current I1 is continued until the point of time t2 (for example, about 0.1 sec.).

As a result, the plunger 42 of the proportional solenoid 40 is pushed leftward by a force corresponding to the magnitude of the command current I1, and presses the valve element 54 against the valve element seat face 51c at the tip end portion. As a result, the valve element seat face 51c is blocked, and a space between the drain flow passages 51b and 51a is reduced, whereby the space between the pilot chamber 34 and the drain port 6 is reduced. Consequently, the pilot pressure Pp corresponding to the magnitude of the command current I1 as shown in FIG. 5b is built up in the pilot chamber 34, and the spool 31 is moved leftward up to the position at which the pilot pressure Pp and the biasing force of the spring 33 are balanced. As a result, the pressure control valve 30 is in an opened state as shown in FIG. 3.

In this opened state, the space between the valve chamber 39 and the drain port 7 is closed, and the space between the valve chamber 39 and the input port 4 is opened. Consequently, discharge oil from the hydraulic pump flows into the oil chamber 12 via the input port 4 and the valve chamber 39, then flows into the oil chamber 13 via the orifice 14, and further flows into the clutch cylinder 1 via the flow passage 17 and the output port 5. Thus, pressure oil with a large flow corresponding to the magnitude of the command current I1 flows into the clutch cylinder 1 in a short time (from the point of time t1 to the point of time t2) until the clutch cylinder 1 reaches a state in the vicinity of substantially a filled state.

In this situation, as a result that the pressure oil flows in via the orifice 14, a pressure difference. P occurs between the oil chamber 12 and the oil chamber 13, and from the relationship between the pressure difference. P and each of the areas A1, A2 and A3 of the aforementioned spool 11, a leftward force acts on the spool 11. As shown in FIG. 3, this action makes the projected portion 11a of the spool 11 abut against the face of the housing 20 inside the oil chamber 13. As a result, the detection pin 21 and the output pin 25 are brought into a non-contact state, and the potential at the point a keeps the predetermined voltage V1 as shown in FIG. 5e.

Next, as shown in FIG. 5a, at the point of time t2, the controller 9 reduces the command current I and outputs a command current I2 corresponding to a predetermined small flow. Thus, the valve element 54 is pressed by the tip end portion of the plunger 42 of the proportional solenoid 40 with a small force corresponding to the magnitude of the command current I2, and therefore it is pressed by the pilot fluid of the pilot chamber 34 to make a clearance from the valve element seat face 51c larger. Consequently, the pilot pressure of the pilot chambers 34 and 52 is reduced until it balances with the force corresponding to the magnitude of the command current I2. The small pilot pressure Pp2 corresponding to the magnitude of the command current I2 as shown in FIG. 5b is built up in the pilot chamber 34, and the spool 31 is moved rightward up to the position at which the pilot pressure Pp2 and the biasing force of the spring 33 are balanced.

As a result, an amount of opening between the valve chamber 39 and the input port 4 is decreased, and therefore a small pressure corresponding to the magnitude of the command current I2 is built up in the valve chamber 39, which allows the pressure oil to flow into the clutch cylinder 1 via the oil chamber 12, the orifice 14, the oil chamber 13 and the flow passage 17 in succession at a small flow. In this situation, since the pressure difference. P occurs between the oil chamber 12 and the oil chamber 13 until the clutch cylinder 1 is filled, a leftward force keeps to act on the spool 11 and the detection pin 21 by the pressure difference. P, the detection pin 21 and the output pin 25 are in a non-contact state, and the potential at the point a keeps the predetermined voltage V1 as shown in FIG. 5e.

(3) At the Time of Completion of Clutch Filling

In the case in which the pressure oil is fed at a small flow and low clutch pressure as described above, when the pressure oil is filled in the clutch cylinder 1, the pressure difference. P between the oil chamber 12 and the oil chamber 13 is eliminated, and thus the spool 11 is moved rightward as shown in FIG. 4 by the aforementioned relationship between each of the pressure receiving areas A1, A2 and A3 of the spool 11. In this situation, the spool 11 presses the cap member 22 rightward against the biasing force of the spring 23 with the pressure P1 inside the oil chamber 12 to bring the detection pin 21 into contact with the output pin 25. As a result, the potential at the point a is reduced to 0V (earth potential) as shown in FIG. 5e, and thus the controller 9 detects a fall of the potential at the point a, and determines the filling is completed.

(4) At the Time of Clutch Pressure Control

As shown in FIG. 5a, when the controller 9 determines the filling is completed at a point of time t3, it sets the command current I at an initial command current I0 corresponding to an initial clutch pressure P0 and outputs it. Thereafter, the controller 9 outputs the command current I, which is gradually increased from the initial command current I0 to a set command current Is corresponding to a predetermined set clutch pressure Ps within a predetermined period of time, to the proportional solenoid 40 to perform oil pressure modulation.

Figure 4:
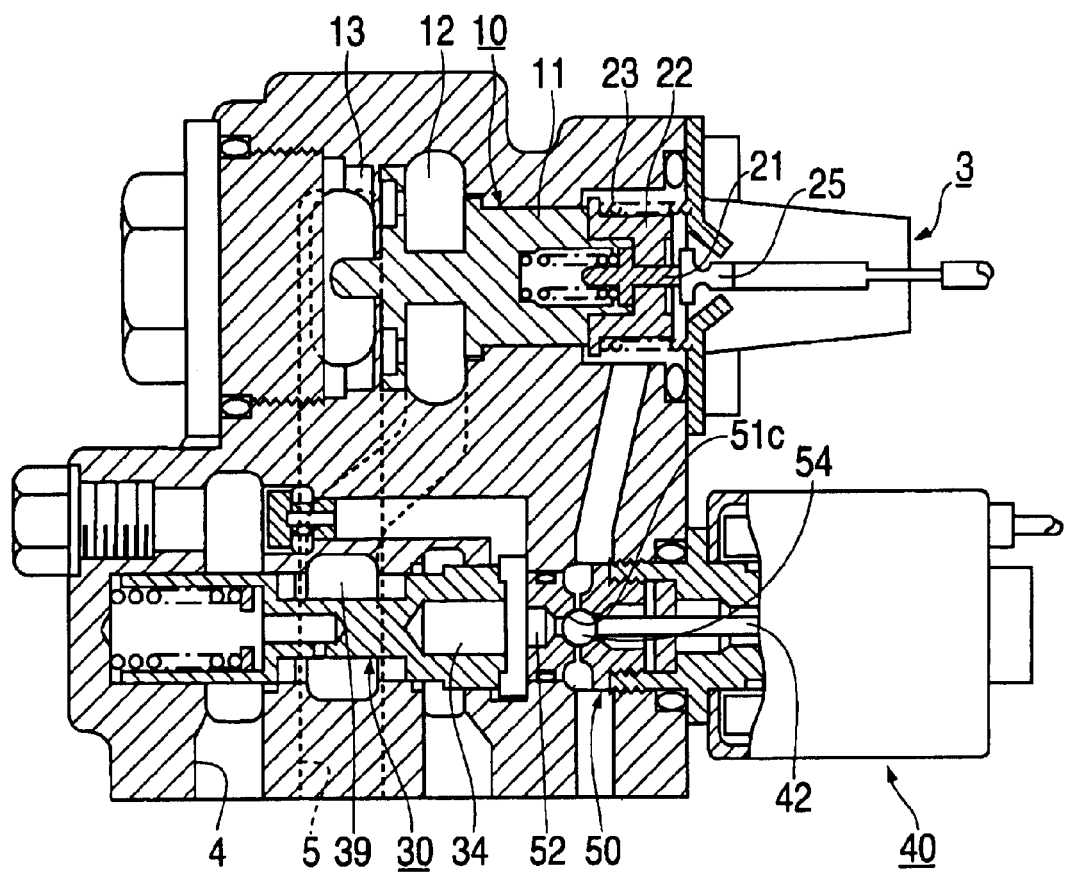
FIG. 4 is an explanatory view of an operation of the first embodiment, which shows a clutch filling completion state.

Consequently, the pressing force of the valve element 54 by the plunger 42 of the proportional solenoid 40 is gradually increased according to the magnitude of the command current I, and accordingly the clearance between the valve element seat face 51c and the valve element 54 is gradually decreased as shown in FIG. 4. As a result of the above, the pilot pressure Pp of the pilot chambers 34 and 52 are gradually increased according to the magnitude of the command current I, as shown in FIG. 5b. Consequently, as shown in FIG. 5c and FIG. 5d, the pressure P1 of the valve chamber 39 (oil chamber 12) and the clutch pressure P2 are similarly increased gradually according to the magnitude of the command current I, and they reach the set clutch pressure Ps at a point of time t4 after the lapse of a predetermined time. Subsequently, the controller continues the output of the command current Is to maintain the set clutch pressure Ps until the clutch is disengaged at a point of time t5 next time. In this situation, since the spool 11 is moved rightward against the spring 23 by the pressure P1 of the oil chamber 12 as shown in FIG. 4, the detection pin 21 and the output pin 25 keeps a contact state, and the sensor section 3 continues to output the filling completion signal.

The operation and effects according to the first embodiment as above will be explained.

(1) The pilot pressure of the pilot chambers 34 and 52 is controlled with the proportional solenoid 40, and the spool 31 of the pressure control valve 30 is controlled by this pilot pressure, thus making it possible to operate the pressure control valve 30 with a large thrust force of the pilot pressure and reduce the occurrence of malfunction caused by dust caught therein. In addition, a small-sized proportional solenoid 40 can be used to obtain a large thrust force by the pilot pressure, and therefore reduction in the size and cost of the fluid pressure control valve apparatus can be realized.

(2) The pilot pressure generating circuit (the throttle flow passage 37a, the flow passages 35 and 36) for generating the pilot pressure from the oil pressure, and the electromagnetic proportional pilot operated valve 50 for generating the pilot pressure according to the magnitude of the command current I to the proportional solenoid 40 are constructed inside the same housing 20 as that of the pressure control valve 30, and therefore the fluid pressure control valve apparatus can be constructed to be compact at low cost.

(3) Since the completion of filling is detected by using the flow detecting valve 10, the completion of filling can be accurately detected without making wrong detection, even if the pressure at the time of filling the oil chamber 13 becomes high because the line resistance of the pipe line and the like to the clutch cylinder 1 is large, or pressure variation in the oil chamber 13 occurs.

Next, a second embodiment will be explained based on FIG. 6 to FIG. 10 and FIG. 11a to FIG. 11e.

Figure 6:
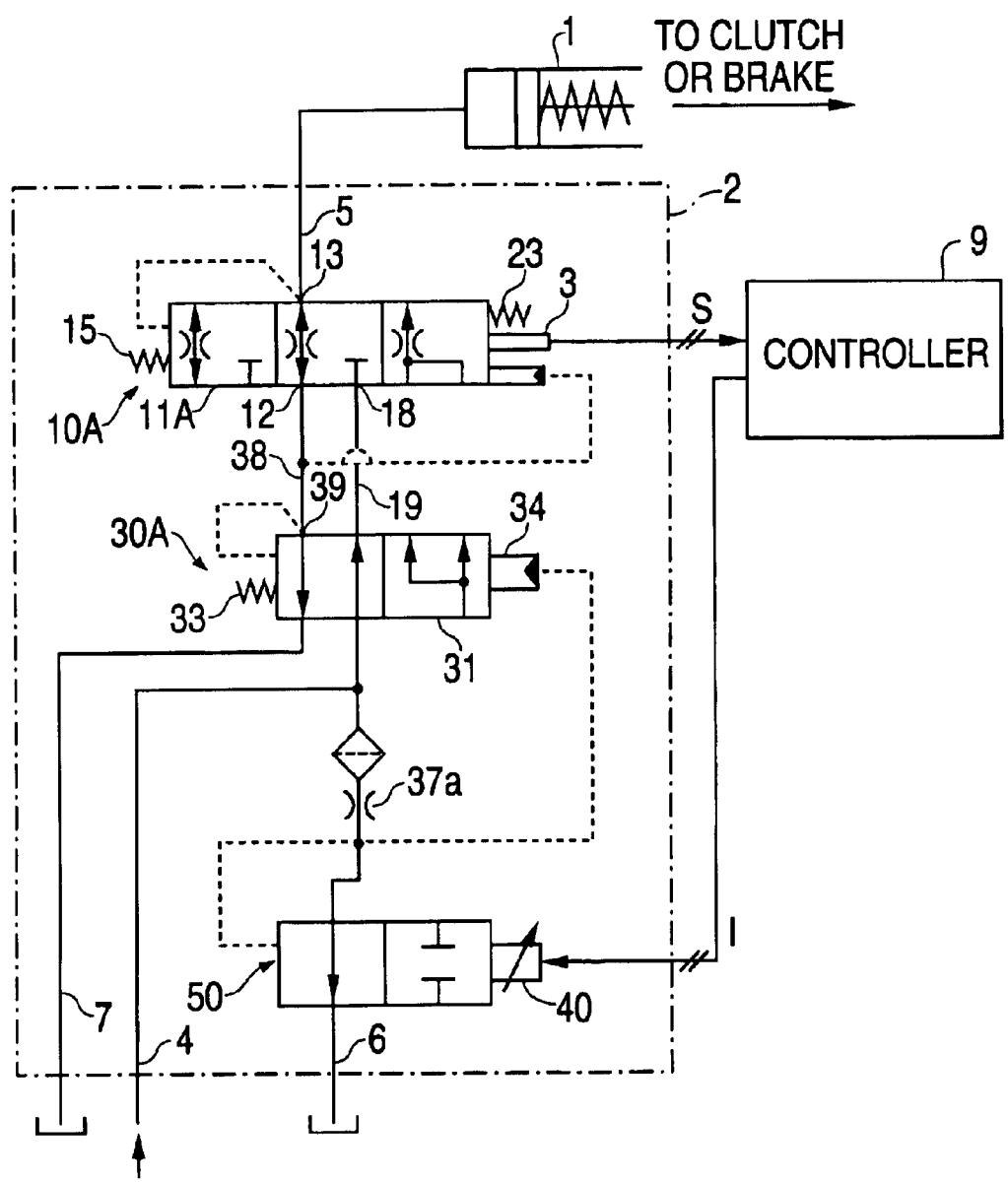
FIG. 6 is a hydraulic circuit diagram of a fluid pressure control valve apparatus of a second embodiment of the present invention.
Figure 7:
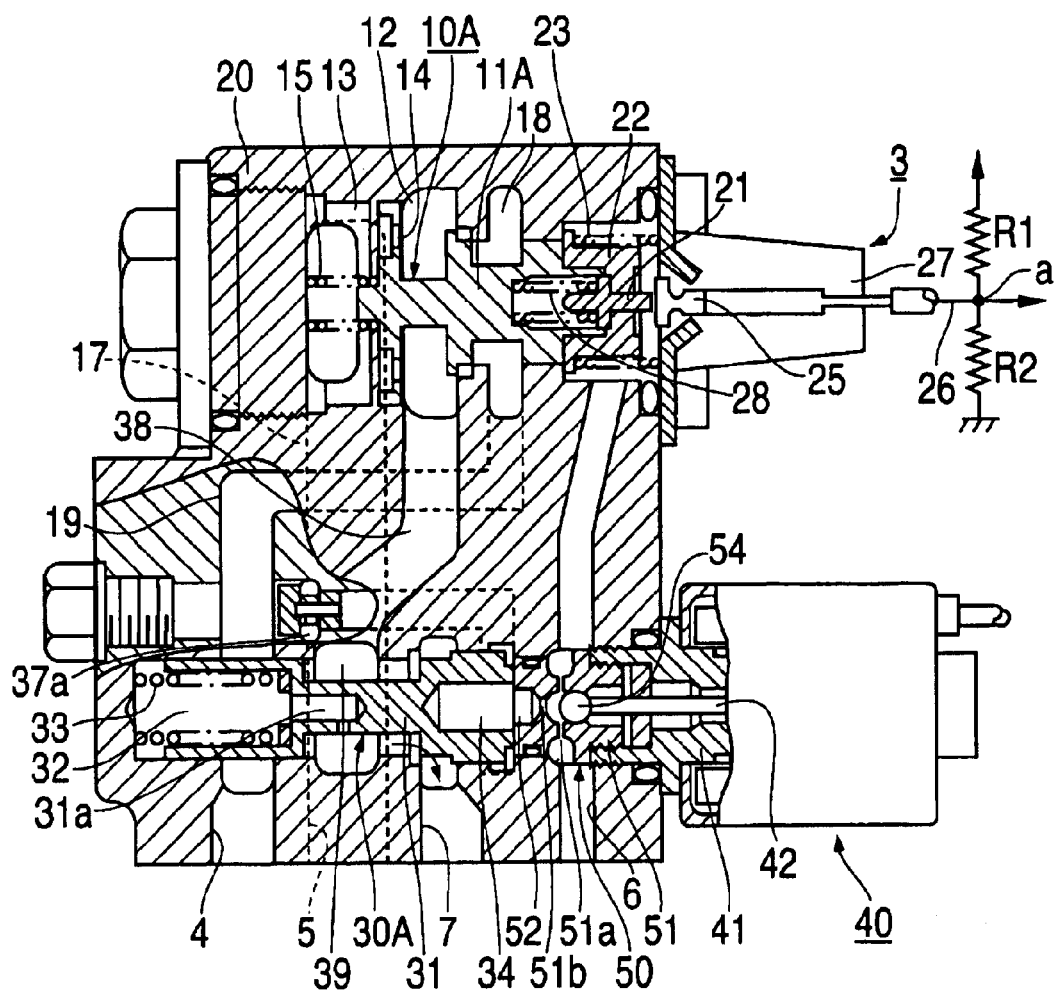
FIG. 7 is a sectional view showing a constitution of a valve of the second embodiment.

FIG. 6 is a hydraulic circuit diagram of a fluid pressure control valve apparatus of the second embodiment, and FIG. 7 is a sectional view showing a constitution of a valve in the same apparatus of the second embodiment. Here, the constitution different from the first embodiment will be explained, and the explanation of the overlapping parts will be omitted. In FIG. 6 and FIG. 7, a control valve (fluid pressure control valve apparatus) 2 includes a flow detecting valve 10A, a pressure control valve 30A, an electromagnetic proportional pilot operated valve 50, a proportional solenoid 40 and a sensor section 3 in an integrated housing 20.

The pressure control valve 30A is provided at a left side of a lower portion of the housing 20, and the electromagnetic proportional pilot operated valve 50 is provided at a right side of the pressure control valve 30A. The pressure control valve 30A includes a flow passage 38 which connects a valve chamber 39 and an oil chamber 12 of the flow detecting valve 10A, and includes a flow passage 19 which connects an oil chamber 18 provided at the flow detecting valve 10A and an input port 4. Three of the oil chambers 18, 12 and 13 are formed by a spool 11A in the flow detecting valve 10A provided at a left side of an upper portion of the housing 20. As described above, the oil chamber 18 is connected to the input port 4 by the flow passage 19. In the oil chamber 13, a spring 15 for biasing the spool 11A in a rightward direction is provided between the spool 11A and the housing 20.

An operation by the constitution of the second embodiment will be explained with reference to a time chart shown in FIG. 11a to FIG. 11e, based on FIG. 6 to FIG. 10. Each axis in FIG. 11a to FIG. 11e shows the same meaning as in FIG. 5a to FIG. 5e. Here, the same explanation as in the first embodiment will be simplified, and the different operation will be explained in detail.

(1) At the Time of clutch Draining

When the command current I of zero is outputted to the proportional solenoid 40, the pilot pressure Pp in the pilot chambers 34 and 52 of the pressure control valve 30A is not built up, and as shown in FIG. 7, the spool 31 is moved rightward by a biasing force of the spring 33 and abuts against a valve scat body 51 of the electromagnetic proportional pilot operated valve 50 to be positioned. Consequently, a space between the valve chamber 39 and the drain port 7 is opened, and pressure in the valve chamber 39 and the oil chamber 12 is not built up. The pressure oil flows into the oil chamber 18 of the flow detecting valve 10A via the flow passage 19 from the input port 4, but the force in a leftward direction, which is caused by the pressure oil inside the oil chamber 18 acting on the spool 11A, and the biasing force in the rightward direction caused by the spring 15 are balanced, and thus the spool 11A is returned to a neutral position shown in FIG. 7.

As a result, the pressure oil inside the clutch cylinder 1 is drained from the drain port 7 via the output port 5, the flow passage 17, the oil chamber 13, the orifice 14 of the spool 11A, the oil chamber 12 and the valve chamber 39 in succession. The detection pin 21 is pressed leftward by a biasing force of the spring 23, which brings the detection pin 21 into a state in which it is not in contact with the output pin 25, and the potential at the point a becomes a predetermined voltage V1 which is derived by dividing the DC voltage V by the resistances R1 and R2, as shown in FIG. 11e.

(2) At the Time of Clutch Filling

Figure 8:
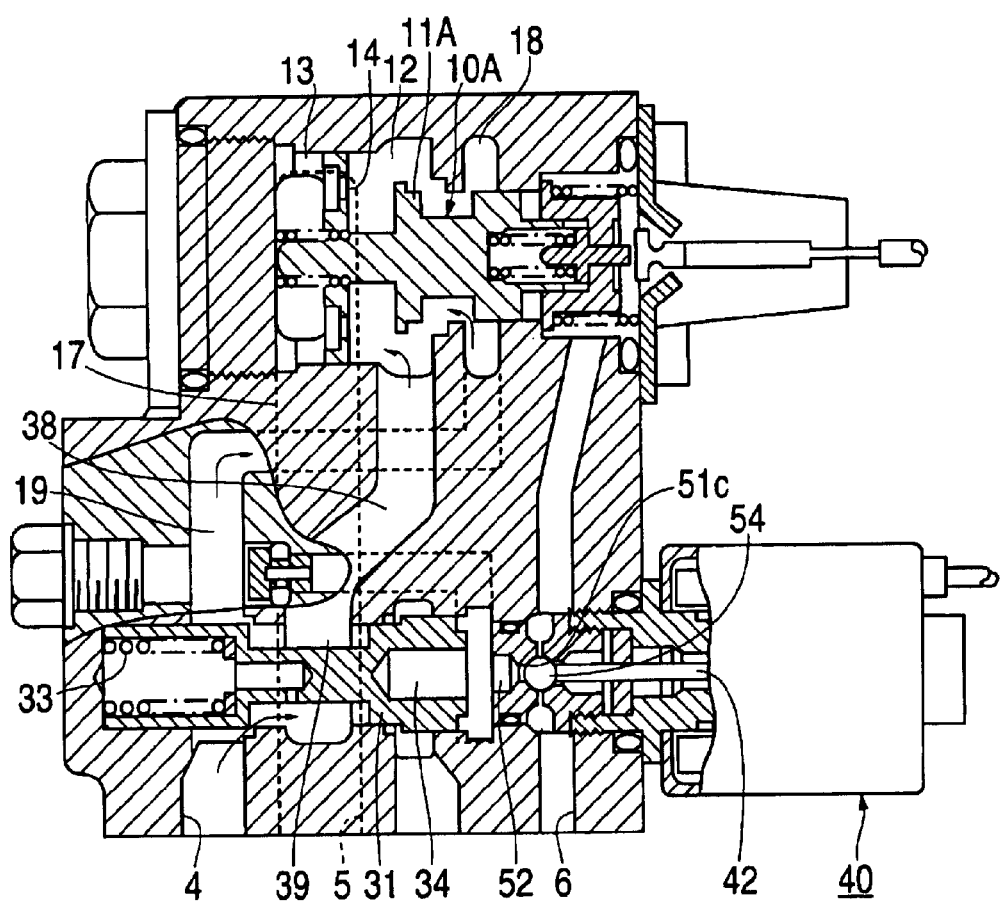
FIG. 8 is an explanatory view of an operation of the second embodiment, which shows a state in which an input port and a valve chamber communicate with each other with a predetermined opened amount.

When the controller 9 outputs a command current I1 for a large flow to the proportional solenoid 40 at the point of time t1, the plunger 42 is pushed leftward by a thrust force corresponding to the magnitude of the above-described command current I1, and presses the valve element 54 against the valve element scat face 51c as shown in FIG. 8. As a result, a passage between the pilot chambers 34 and 52, and the drain port 6 is reduced, whereby the pilot pressure Pp corresponding to the magnitude of the command current I1 as shown in FIG. 11b is built up in the pilot chambers 34 and 52, and the spool 31 is moved leftward up to the position at which the pilot pressure Pp and the biasing force of the spring 33 are balanced. As a result, a space between the input port 4 and the valve chamber 39 is opened by a predetermined amount as shown in FIG. 8, and therefore pressure oil from the hydraulic pump flows into the oil chamber 12 via the input port 4, the valve chamber 39 and the flow passage 38 in succession, then flows into the oil chamber 13 via the orifice 14 of the spool 11A, and flows into the clutch cylinder 1 via the flow passage 17 and the output port 5.

In this situation, from the relationship between the pressure difference. P that occurs between the oil chambers 12 and 13 on both sides of the orifice 14 and the pressure receiving areas A1, A2 and A3 of the spool 11A, the spool 11A is moved leftward, and a space between the oil chambers 18 and 12 is opened. As a result, the pressure oil which reaches the inside of the oil chamber 18 via the flow passage 19 from the input port 4 flows into the oil chamber 12, and thus the pressure oil at a large flow flows into the clutch cylinder 1. Consequently, the pressure oil at a large flow corresponding to the magnitude of the command current I1 flows into the clutch cylinder 1 for a short time (from a point of time t1 a point of time t2) until the clutch cylinder 1 reaches a state in the vicinity of substantially a filled state.

Next, as shown in FIG. 11a, at the point of time t2, the controller 9 outputs a command current I3 corresponding to a predetermined small flow. Thus, the valve element 54 is pressed by the plunger 42 of the proportional solenoid 40 with a small force corresponding to the command current I3, which makes a clearance from the valve element seat face 51c larger, and reduces the pilot pressure of the pilot chambers 34 and 52. Consequently, the small pilot pressure Pp3 corresponding to the magnitude of the command current I3 as shown in FIG. 11b is built up in the pilot chamber 34, and the spool 31 is moved rightward up to the position at which the pilot pressure Pp3 and the biasing force of the spring 33 are balanced.

Figure 9:
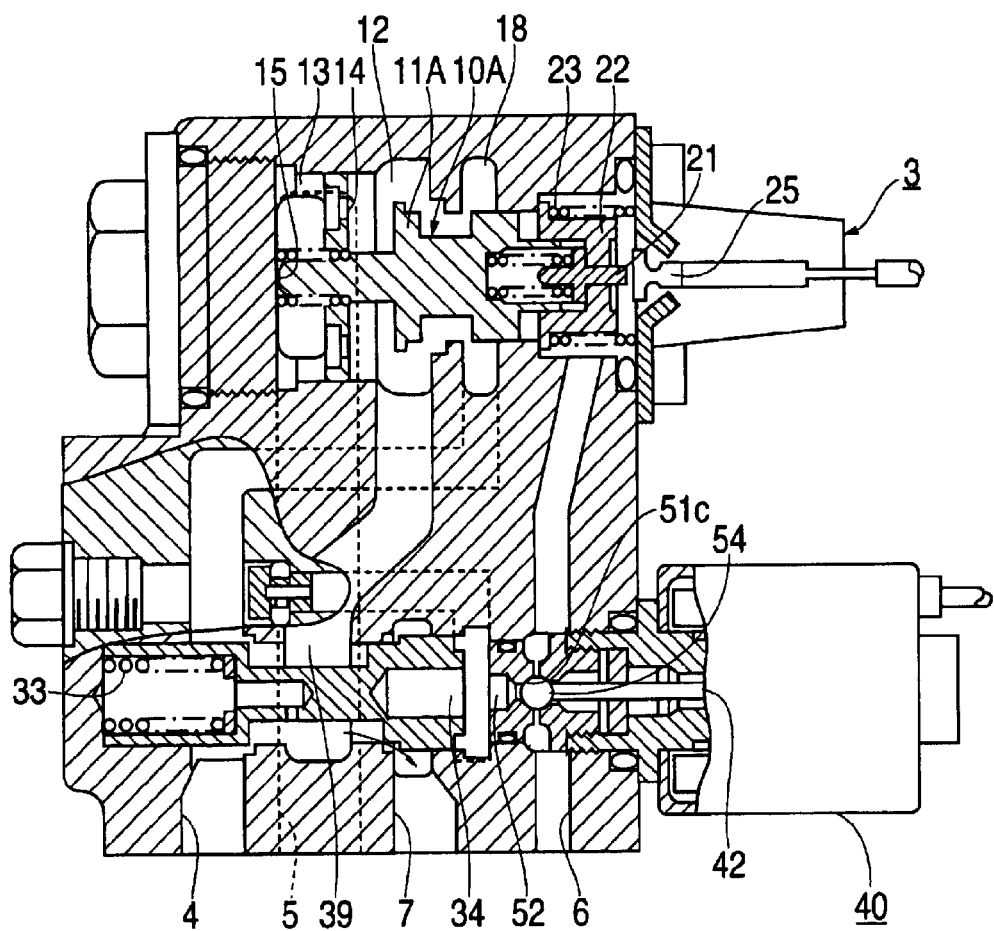
FIG. 9 is an explanatory view of an operation of the second embodiment, which shows a state in which the input port and the valve chamber is shut off from each other.

As a result, as shown in FIG. 9, a space between the valve chamber 39 and the input port 4 is closed, and the space between the valve chamber 39 and the drain port 7 is opened by a small opened amount, and a space between the oil chamber 18 and the oil chamber 12 of the flow detection valve 10A remains opened. Consequently, the pressure oil flows into the clutch cylinder 1 from the input port 4 via the oil chamber 18, the oil chamber 12, the orifice 14 of the spool 11A, the oil chamber 13 and the output port 5, and part of the pressure oil is drained from the oil chamber 12 via the valve chamber 39 and the drain port 7. As a result, the clutch pressure P2 is reduced to a small pressure corresponding to the command current I3. The pressure oil flows into the clutch cylinder 1 at a smaller flow than the flow corresponding to the command current I1. In this situation, non-contact state of the detection pin 21 and the output pin 25 is maintained by the pressure difference. P between the oil chamber 12 and the oil chamber 13, and the potential at the point a keeps the predetermined voltage V1 as shown in FIG. 11e.

(3) At the Time of Completion of Clutch Filling

When the pressure oil is filled in the clutch cylinder 1, the pressure difference. P between the oil chamber 12 and the oil chamber 13 is eliminated, and thus oil pressure in the rightward direction acts on the spool 11A from the aforementioned relationship between each of the pressure receiving areas A1, A2, and A3 of the spool 11A. In this situation, the spool 11A presses the cap member 22 rightward against the biasing force of the spring 23 with the pressure P1 inside the oil chamber 12 to bring the detection pin 21 into contact with the output pin 25. As a result, the potential at the point a is reduced to 0V as shown in FIG. 11e, and thus the controller 9 detects the fall of the potential at the point a, and determines the completion of filling.

(4) At the Time of Clutch Pressure Control

As shown in FIG. 11a, when the controller 9 determines the completion of filling at a point of time t3, it sets the command current I at an initial command current I0 corresponding to an initial clutch pressure P0 and outputs it. Thereafter, the controller 9 outputs the command current 1, which is gradually increased from the initial command current I0 to a set command current Is corresponding to a predetermined set clutch pressure Ps, to the proportional solenoid 40 to perform oil pressure modulation within a predetermined period of time.

Figure 10:
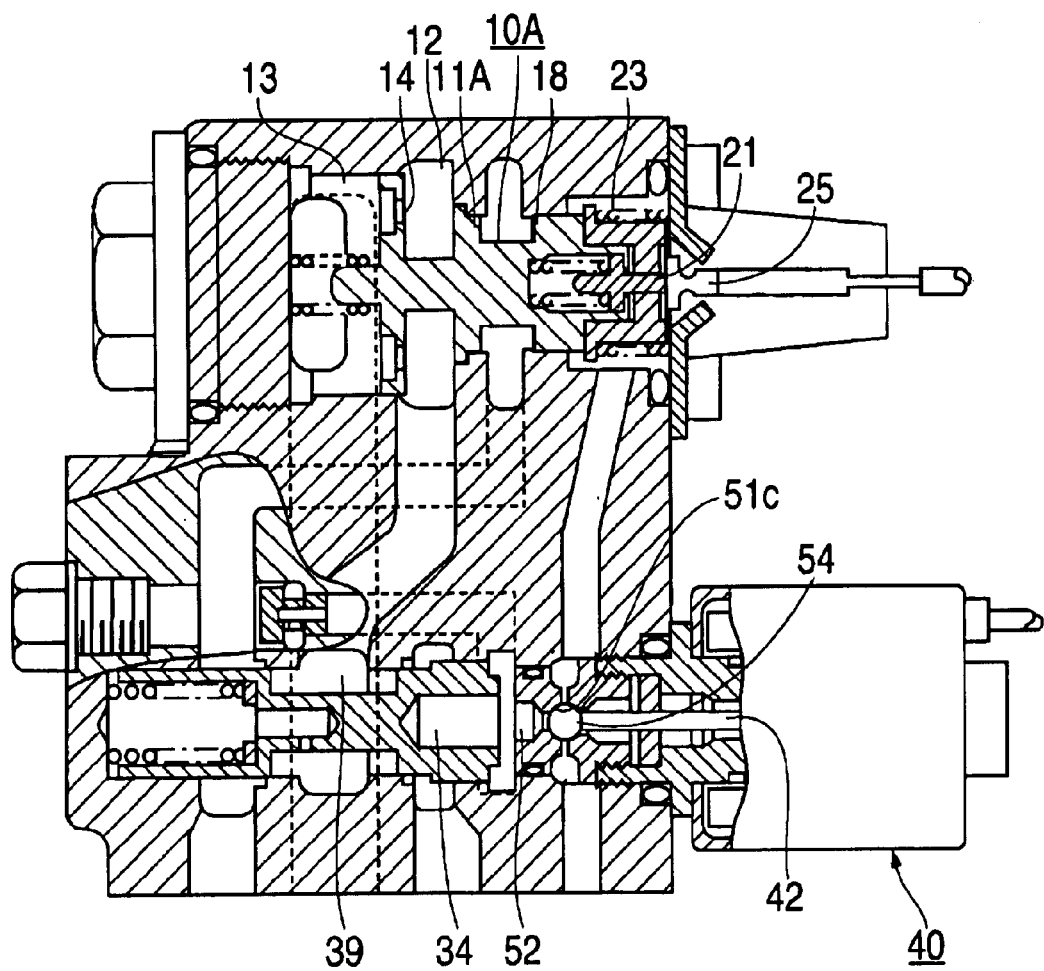
FIG. 10 is an explanatory view of an operation of the second embodiment, which shows a state at a time of adjusting a clutch pressure.
Figure 12:
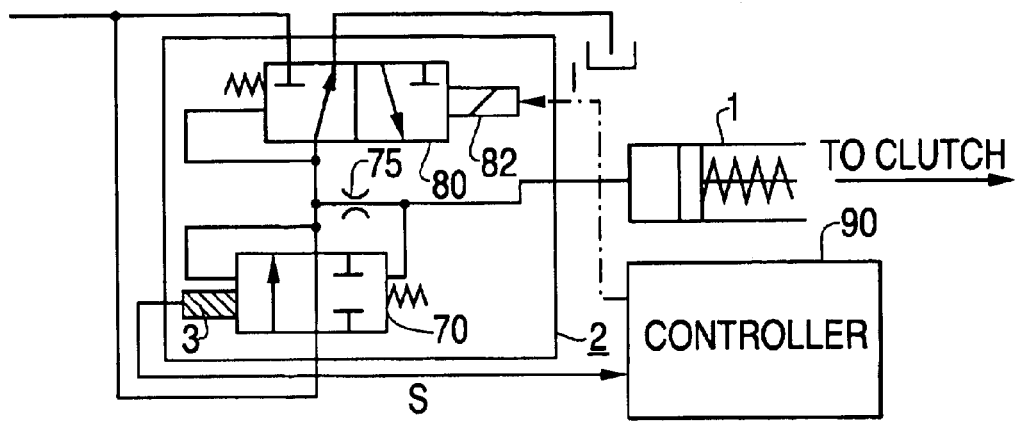
FIG. 12 is a hydraulic circuit diagram of a clutch oil pressure control apparatus of a prior art.
Figure 13:
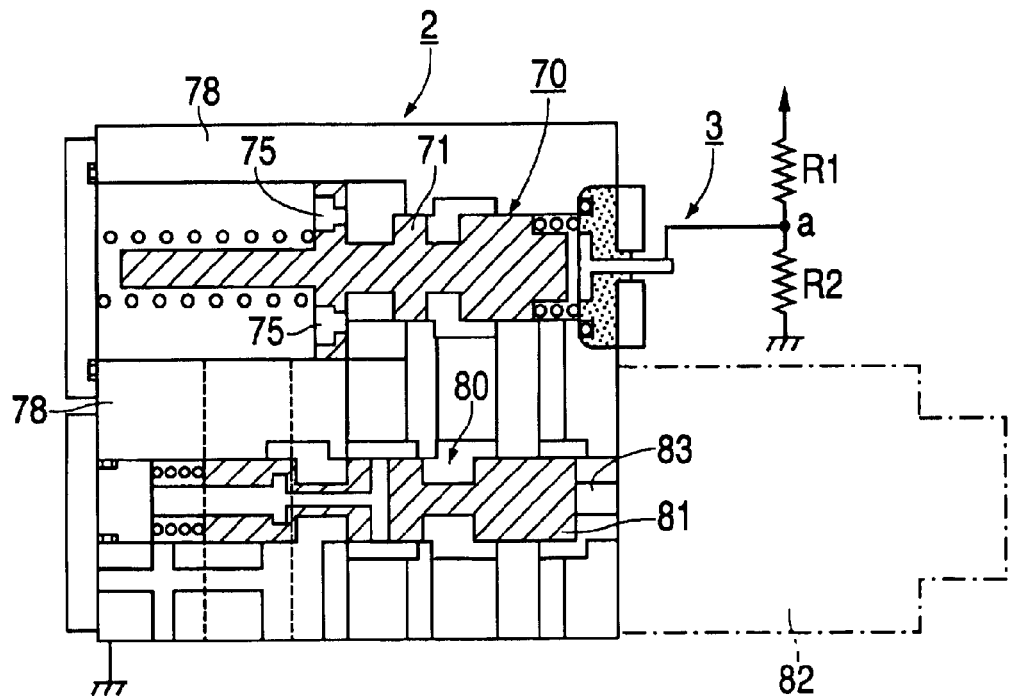
FIG. 13 is an explanatory view showing a section of a constitution of the control valve in FIG. 12.

Consequently, the pressing force of the valve element 54 by the plunger 42 of the proportional solenoid 40 is gradually increased according to the magnitude of the command current I. Following the gradual increase, a clearance between the valve element scat face 51c and the valve element 54 is gradually decreased as shown in FIG. 10, and therefore the pilot pressure Pp of the pilot chambers 34 and 52 is gradually increased according to the magnitude of the command current I as shown in FIG. 11b. Consequently, as shown in FIG. 11c and FIG. 11d, the pressure P1 of the valve chamber 39 and the clutch pressure P2 arc similarly increased gradually according to the magnitude of the command current I, and they reach the set clutch pressure Ps at a point of time t4 after the lapse of a predetermined time. Subsequently, the controller continues to output the command current Is to maintain the set clutch pressure Ps until the clutch is disengaged at a point of time t5 next time. In this situation, as shown in FIG. 10, since the spool 11A is moved rightward against the spring 23 by the pressure P1 of the oil chamber 12, the detection pin 21 and the output pin 25 remains in a state in contact with each other, and the sensor section 3 continues to output the filling completion signal.

According to the second embodiment, the following operation and effects can be obtained.

(1) In the second embodiment, as in the first embodiment, the pilot pressure of the pilot chambers 34 and 52 is controlled with the proportional solenoid 40, and the spool 31 of the pressure control valve 30A is operated by this pilot pressure. As a result, it is made possible to operate the pressure control valve 30A with a large thrust force of the pilot pressure and reduce the occurrence of malfunction caused by dust caught therein. In addition, a small-sized proportional solenoid 40 can be used as in the first embodiment, and therefore reduction in the size and the cost of the fluid pressure control valve apparatus can be realized.

(2) Since completion of filling is detected by using the flow detecting valve 10A, completion of filling can be accurately detected as in the first embodiment.

(3) When a fluid at a large flow is fed, the pressure control valve 30A and the flow detecting valve 10A feed it through two routes, that is, two routes from the valve chamber 39 to the oil chamber 12 and from the input port 4 to the oil chamber 18 to the oil chamber 12, and therefore fluid filling time can be reduced.

(4) The pilot pressure generating circuit and the pilot pressure control circuit are constructed in the same housing as the pressure control valve, and therefore the fluid pressure control valve apparatus can be similarly constructed to be compact at low cost.

As explained thus far, according to the present invention, the following effects are provided.

Since the pressure control valve is made a pilot pressure operating type, it can be surely operated with a larger thrust force than when it is directly operated by the proportional solenoid, occurrence of the malfunction of the pressure control valve caused by the dust caught therein can be reduced, and reliability can be improved. The generation circuit and the control circuit of the pilot pressure can be compactly installed in the same housing of the fluid pressure control valve apparatus, and a large thrust force of the pilot pressure can be obtained even with use of a small-sized proportional solenoid, thus making it possible to construct the fluid pressure control valve apparatus to be small in size and compact, and reduce cost. Further, since the completion of filling is detected with use of the flow detecting valve, it can be accurately detected without having an influence by the line resistance to the clutch cylinder.

What is claimed is:

1. A fluid pressure control valve apparatus for a clutch or a brake, which controls pressure of a fluid and feeds the fluid to a clutch or a brake, comprising:

a pressure control valve for controlling a fluid pressure to said clutch or said brake;

an electromagnetic proportional pilot operated valve for issuing an operation command for said pressure control valve with a pilot pressure corresponding to a command current applied to a proportional solenoid; and a flow detecting valve for detecting a flow of the fluid fed to said clutch or said brake from said pressure control valve to detect completion of filling in said clutch or said brake.

2. The fluid pressure control valve apparatus for the clutch or the brake according to claim 1, wherein said pressure control valve has a feedback chamber at one end side of a spool, and a pilot chamber for receiving the pilot pressure at the other end side, introduces the fluid, which is to be fed to said clutch or said brake, into said feedback chamber, balances the pressure of the fluid, which is introduced into said feedback chamber, with a magnitude of the pilot pressure generated in said pilot chamber to increase pressure of the fed fluid, and controls the pressure in a cylinder of said clutch or said brake; and wherein said electromagnetic proportional pilot operated valve has a valve element, which moves between a fully opened state and a shutoff state of a drain outlet path of a pilot fluid introduced into said pilot chamber to control a drain outlet flow of the pilot fluid, and controls the pilot pressure by moving said valve element from said shutoff position to said fully opened position with a thrust force of a plunger of said proportional solenoid.

3. The fluid pressure control valve apparatus for the clutch or the brake according to claim 1, said fluid pressure control valve apparatus further comprising:

a housing in which a first pump oil passage that communicates with a fluid pressure source, a second pump oil passage and a cylinder chamber inlet passage which communicate with a cylinder of said clutch or said brake, and a cylinder chamber fluid drain passage for draining the fluid inside said cylinder are formed;

wherein said pressure control valve i) is movably housed in said housing, and biased by a spring to a position to shut off the communication between said first pump oil passage and said second pump oil passage and communicate said second pump oil passage and said cylinder chamber fluid drain passage, and ii) moves between a position to shut off said second pump oil passage and said cylinder chamber fluid drain passage from each other and communicate said first pump oil passage and said second pump oil passage, and a position to shut off the communication between said first pump oil passage and said second pump oil passage and communicate said second pump oil passage and said cylinder chamber fluid drain passage, by a pressure of a clutch pressure feedback chamber that is formed at one end side and communicates with said second pump oil passage, and a pressure of a pilot pressure receiving chamber formed at the other end side; and wherein said flow detecting valve is placed in said housing, allows a flow of the fluid, which is from said second pump oil passage to said cylinder chamber inlet passage, to flow therein via a throttle passage, and when the flow of the fluid via said throttle passage is stopped as a result of the fluid being filled in said cylinder chamber inlet passage, moves by a pressure difference between before and after said throttle passage to be in contact with a sensor section, and detects the filling of the fluid in said cylinder, said fluid pressure control valve apparatus further comprising:

a pilot fluid inlet path which is formed inside said housing, extends from said first pump oil passage via the throttle flow passage to be branched, and allows the pilot fluid to flow into said pilot pressure receiving chamber;

a pilot fluid outlet path which is formed inside said housing and drains the pilot fluid from said pilot pressure receiving chamber; and a valve element which is placed inside said housing, and moves between a shutoff communication position, a throttled communication position by an optional amount, and an fully opened communication position, so as to connect said pilot fluid inlet path and said pilot fluid outlet path to be controllable, wherein said electromagnetic proportional pilot operated valve is placed at an outer wall of said housing, and wherein the proportional solenoid controls a pressure level of the pilot fluid in said pilot pressure receiving chamber by controlling a moving position of said valve element in order to control a moving position of said pressure control valve so that a pressure inside said clutch pressure feedback chamber and a pressure inside said pilot pressure receiving chamber balance with each other.

* * * * *